Figure 1:
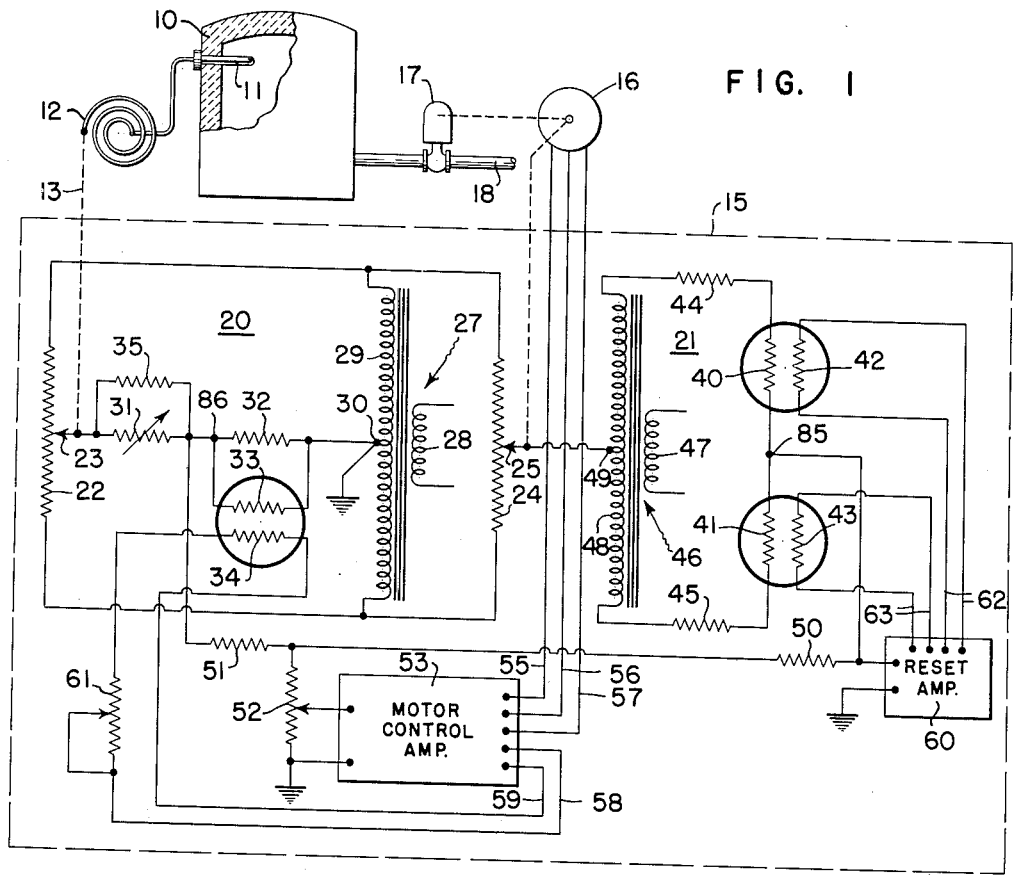

April 24, 1956

R. J. EHRET 2,743,402

MEASURING AND CONTROL APPARATUS

Filed July 15, 1953

*INVENTOR.*
ROBERT J. EHRET

BY Arthur H. Swanson

ATTORNEY.

United States Patent Office 2,743,402
Patented Apr. 24, 1956

2,743,402
MEASURING AND CONTROL APPARATUS

Robert J. Ehret, Philadelphia, Pa., assignor to Minneapolis-Honeywell Regulator Company, Minneapolis, Minn., a corporation of Delaware Application July 15, 1953, Serial No. 368,188

12 Claims. (Cl. 318—29)

A general object of the present invention is to provide an improved measuring and control apparatus for effecting proportional control action. More specifically, the object of the present invention is to provide an improved controller of the proportional type wherein the proportioning action will be automatically varied to meet the changing demands of the process which is being controlled.

The accurate controlling of process variables, such as pressure, temperature, flow, etc., is required in many industrial processes. Proportioning controllers have been found to be the most universally adapted for use in such process controls. These proportional controllers generally take the form of a balanceable apparatus wherein the magnitude of a process variable may be used to introduce an unbalance into the controller and with the controller output providing both the controlling action to regulate the variable and a rebalancing action for the controller.

The ratio of input unbalance action due to a change in the variable to output rebalance action of the controller is frequently referred to as the proportional band of the controller. Thus, if one unit of input unbalance is eliminated by one unit of output rebalancing action, the proportional band is considered as being one hundred per cent. If the controller has been changed so that one unit of input unbalance is eliminated by two units of rebalancing action, the proportional band is fifty per cent.

By narrowing the proportional band, that is to say, reducing the percentage factor, it is possible to increase the sensitivity of response, or corrective action of the controller. However, if the proportional band is made too narrow, the controlling action approaches "on-off" action which is unstable and tends to introduce hunting or oscillation of the controlled variable. While accurate control requires high sensitivity, the process variable should not be allowed to oscillate or hunt. It has been found that if the controller proportional band is maintained at or near the point of instability it is possible to attain a higher degree of accuracy in the controlling action of the controller. It has been further found that if there is an instability in the process control loop, the proportional band should be increased or widened to bring back stability to the variable in the process.

It is therefore a more specific object of the present invention to provide an improved electrical controller having an adjustable proportional band wherein a condition indicative of instability in a control process loop will cause a widening of the proportioning band.

A further more specific object of the present invention is to provide a new and improved controller which will proportionally adjust the proportioning band of a controller in accordance with the output controlling action of the controller.

Still another more specific object of the present invention is to provide an improved controller of the electrical balanceable network type wherein a voltage divider across the network is effective for varying the proportional band of the controller and wherein the voltage divider is varied in accordance with a condition indicative of the presence of an unstable process control loop.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Figure 2:
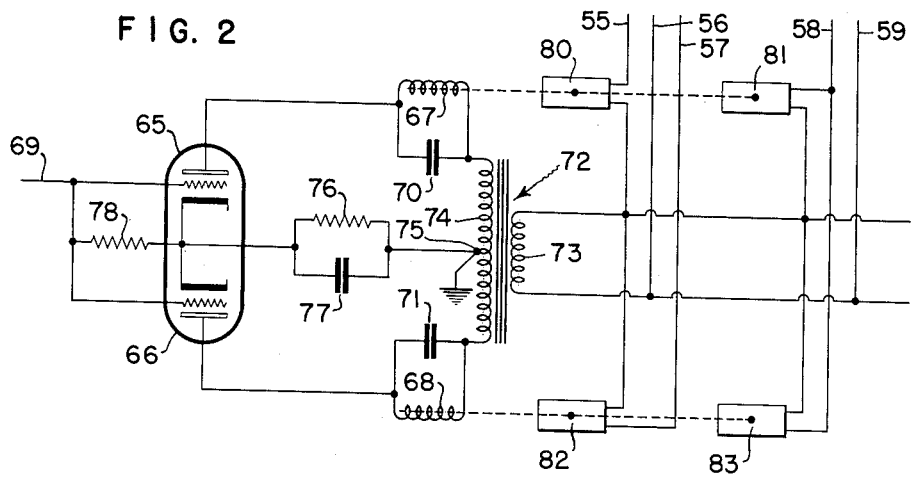

Of the drawings:

Fig. 1 is a diagrammatic showing of a form of process control which includes the present invention; and Fig. 2 is a showing of a portion of the amplifier which may be used in the apparatus shown in Fig. 1.

Referring to Fig. 1, the numeral 10 represents a furnace whose temperature is to be controlled. Sensing the temperature within the furnace 10 is a sensing element 11 which may be of the thermal fill type which is connected to a suitable spiral 12. The spiral 12 has an output connection 13 which will produce a desired controlling action in the controller of the present apparatus. The controller defined by the apparatus inside of the dotted line enclosure 15 is effective to respond to the input signal from the spiral 12 and produce an output controlling action which will be effective to drive a motor 16 which may be a part of a fuel flow control valve 17 which is positioned in a fuel supply conduit 18 on the input to the furnace 10.

The general controlling action of the apparatus thus far set forth is that temperature variations in the furnace 10 detected by the sensing element 11 will introduce an unbalance into the controller 15. The controller will in turn produce an output controlling signal for the motor 16 which will apply a corrective action by way of the valve 17 to the fuel flowing into the furnace 10 so that the furnace temperature may be brought back to the desired value.

The electrical controller 15 is basically the same as the electrical controller disclosed and claimed in my copending application entitled Electric Proportioning Control Apparatus With Automatic Reset, Serial No. 160,158, filed May 5, 1950, now Patent No. 2,694,169, November 9, 1954. Reference should be had to this copending application for details of the basic electrical circuit as well as the associated amplifiers. The controller 15 comprises a pair of network sections 20 and 21. The network section 20 is the proportioning section while the network 21 is the reset section. The section 20 comprises an input potentiometer slidewire 22 having an associated slider 23 which is arranged to be positioned by the connection 13 from the spiral 12. Section 20 also includes a follow-up or rebalancing slidewire resistor 24 having an associated slider 25 which is arranged to be positioned by the output action of the control motor 16. Power is supplied to the section 20 by way of a transformer 27 having a primary winding 28 and a secondary winding 29 which is tapped and grounded at 30. Connected between the slider 23 and tap 30 is an adjustable resistor 31 which may serve as a manual means of adjusting the proportional band of the controller. Also in the series connection is a resistor 32 which has a temperature sensitive resistor 33 connected in parallel therewith. The temperature sensitive resistor 33 is adapted to be heated by a heater resistor 34. Also present is an ambient temperature compensating resistor 35.

The network section 21 comprises a pair of temperature sensitive resistors 40 and 41 which are arranged to be heated by a pair of cooperating heaters 42 and 43 respectively. Also included in the section 21 are a pair of fixed resistors 44 and 45. Power is supplied to the section 21 by way of a suitable power transformer 46 having a primary winding 47 and a secondary winding 48 which is tapped at 49.

A pair of resistors 50 and 51 provide a voltage divider across the outputs of the two sections 20 and 21 and provide a connection point for a potentiometer slidewire resistor 52 which is connected to the input of an amplifier 53. The output of the amplifier 53 is arranged to supply a driving signal for the motor 16 by way of the output leads 55, 56, and 57. A pair of conductors 58 and 59 also provide an output signal from the amplifier 53 for the heater 34.

A reset amplifier 60 is also provided and this amplifier is arranged to supply power to the heaters 42 and 43 by way of the conductors 62 and 63 respectively.

Before considering the operation of Fig. 1, reference will be had to Fig. 2 to consider the output details of the amplifier 53. The output portion of the amplifier will be seen to comprise a pair of triodes 65 and 66 which are connected as a phase discriminator circuit which will be effective to cause the operation of a pair of relays 67 and 68 in accordance with the phasing of the alternating current applied to the input of the triodes 65 and 66 by way of input lead 69. The relay 67 has a suitable bypass condenser 70 connected in parallel therewith while the relay coil 68 has a condenser 71 connected in parallel therewith. Power is supplied to the triodes 65 and 66 by way of a transformer 72 having a primary winding 73 and a secondary winding 74 which is center tapped at 75. A resistor 76 having a condenser 77 connected in parallel therewith is connected between the tap 75 and the cathodes of the triodes 65 and 66. A resistor 78 is connected between the input terminal 69 and the cathodes of the devices 65 and 66.

The relay coil 67 is arranged to control the operation of relay contacts 80 and 81. The contact 80 is connected in the lead 55 running to the motor 16 while the contact 81 is connected in the lead 58 controlling the heating current to the heater 34. The relay coil 68 controls the operation of relay contact 82 which is connected in the lead 57 running to the motor 16. The coil 68 additionally controls the operation of a contact 83 which is also connected in the lead 58 supplying power to the heater 34. When the relay coils are energized, the respective contacts associated therewith are closed so as to complete the electrical circuits which run therethrough. As the circuit is a phase discriminator, only one of the relays or the other will be operative at any one time. By this arrangement it is possible to effect reversible operation of the motor 16 in accordance with the phasing of the input signal on the input 69. Additionally, it is possible to supply a heating current to the heating resistor 34 when either of the relay contacts 81 and 83 is closed.

Considering now the operation of Fig. 1, it is first assumed that the apparatus as shown in the figure is in a balanced state. When in a balanced condition, the slider 23 will be in a center position on the slidewire resistor 22 and the slider 25 will be in a center position on the slidewire 24. In addition, the resistances of the resistors 40 and 41 will be such that the voltage between their junction at 85 and the center tap 49 on the secondary 48 will be zero. With this balance condition, there will be no input signal applied to the input of the reset amplifier 60 since the voltage for the input of the amplifier 60 is derived from the position of the slider 25 on the slidewire resistor 24 and the voltage from the reset section 21. With no input on the input of the reset amplifier 60, the output from the amplifier will be balanced so that the heating effect of the heaters 42 and 43 will be the same and the values of the temperature sensitive resistors 40 and 41 will be the same.

There will also be no input to the amplifier 53. This will be evident since the voltage applied to the input by way of resistor 50 is derived by a circuit that may be traced from the ground terminal 30 to slider 25, tap 49, junction 85, and resistor 50 to the input. As pointed out above, the voltage in this last traced circuit on the input of the reset amplifier was zero and therefore it will be zero as concerns the amplifier 53. Further, since the slider 23 is in the center position which corresponds to the center tap 30, there will be no voltage applied across the resistors 31 and 32 so that at junction 86, there will be no voltage and thus no voltage applied through the resistor to the input of the amplifier 53. With no input applied to the amplifier, the control relays, shown in Fig. 2, will both be de-energized and there will be no output controlling action from the amplifier.

With the amplifier 53 having no output controlling action, the heater 34 will be de-energized and the resistor 33 will be cooled. While the resistor is cool, it will have a relatively high resistance with the result being that the junction 86 will be closer to the actual potential condition existing on the slider 23 than to the ground tap 30.

If there should be an upset in the temperature within the furnace 10 so that the sensing element 11 will produce an output signal to move the slider 23 over the associated slidewire resistor 22, there will be an unbalance signal injected into the apparatus. The immediate effect of this unbalance signal will be to create an unbalance on the input of the amplifier 53 which will operate one or the other of the output relays thereof to cause the motor 16 to drive the valve 17 in a direction to correct the temperature change in the furnace 10. This movement by the motor 16 will create a followup action in the network 20 by the movement of the slider 25 over the slidewire resistor 24. The motor 16 will be operative until such time as the slider 25 has been moved to eliminate the unbalance condition created by the movement of the slider 23. As soon as a balance position has been reached, the amplifier 53 will become ineffective to drive the motor 16 any further and the apparatus will temporarily hold this position.

If the temperature deviation is not corrected by the movement of the motor 16 so that the apparatus goes back to its originally assumed position, a further corrective action takes place and this is accomplished by the reset network 21. As pointed out above, the only signals which are applied to the input of the amplifier 60 are derived from the position of the slider 25 and the signal from the reset section 21. Any deviation of the slider 25 from its center position will introduce a control signal into the reset amplifier 60. The reset amplifier, which is a phase sensitive amplifier, will sense this unbalance and produce an output heating action on the heaters 42 and 43 in such a manner as to unbalance the reset section 21 in a direction or phase opposite to the unbalance created by the displacement of the slider 25 from its center position. As the heating action of the heaters 42 and 43 with respect to the associated sensing resistors 40 and 41 is relatively slow, the effect of the reset section 21 is not immediately felt in the control network. However, if the slider 25 remains displaced for a long enough period, the reset section 21 will slowly eliminate the unbalance on the input of the reset amplifier 60. If this rebalancing action of the slider 25 is completely eliminated by the reset section 21, the amplifier 53 will sense only the unbalance of the slider 23 on the slidewire resistor 22. This will mean that the amplifier 53 will call for a further action of the motor 16 and the motor will again operate until a balance condition is reached by the movement of the slider 25 to a new position. Again, the reset section 21 will slowly eliminate the rebalancing action of the slider 25 and if the temperature within the furnace 10 does not come back to the desired value which is indicated by the slider 23 being centered on the slidewire resistor 22, the apparatus will again go through another operation to try to bring the temperature to the desired value.

As thus far explained, the apparatus is basically the same as that of my copending application mentioned above, with the apparatus providing a controlling action which attempts to maintain the temperature within the furnace 10 exactly at the desired value.

The operation as discussed up to this point has not considered the effect of the heater 34 on the resistor 33. It will be noted that when the resistors 32 and 33 are in parallel, with the resistor 33 cool, that the point 86 is effectively closer to the potential existing at the slider 23. With this point 86 closer in potential to the slider 23, the proportional band of the apparatus is narrow. In other words, a small movement of the slider 23, with the controller set to have a narrow proportional band, will require that the slider 25 move a considerably larger distance in attempting to effect rebalancing of the input unbalance created by the slider 23. If the ratio of movement of the slider 23 with the slider 25 is one to one, the proportional band will be one hundred per cent, as mentioned above. The narrower the proportional band, the greater will be the output controlling action for a unitary change in the magnitude of the sensed variable.

As greater accuracy of control may be accomplished by a narrow proportional band, it is desirable that the point 86 normally be maintained at the potential which is closer to the slider 23. This will be accomplished as long as the net resistance of the parallel connected resistors 32 and 33 is relatively large. As mentioned above, the narrow proportional band does tend to introduce instability into the control loop so that if there is an indication of instability, it is desirable to widen the proportional band. This widening is accomplished in the present apparatus by the heater 34 heating the associated negative temperature coefficient resistor 33 so as to decrease the resistance thereof. The decreasing of the resistance of the resistor 33 will cause the junction 86 to be effectively shifted in potential toward the grounded tap 30 and thus broaden the proportional band of the apparatus. As any output controlling action from the amplifier 53 is indicative of some instability in the control loop which includes the temperature within the furnace 10, it is desirable to widen the proportioning band. As the operation of the relays of the amplifier 53 is indicative of a variable deviation, these relays may be used to control the energization of the heater 34. The extent of the proportional band widening due to the action of the heater 34 will be dependent upon the time length of operation of the output relays of the amplifier 53 as well as the adjustment of the output relays of the amplifier 53 as well as the adjustment of the rheostat 61.

Under certain operating conditions, particularly near the end positions of the operation of the motor 16, it is possible to obtain a condition wherein the widening of the proportioning band will create a signal on the input of the amplifier 53 indicative of a corrective action calling for movement of a valve toward its center position even though an input error signal is calling for movement of the valve in the opposite direction. This condition may be corrected by slowing down the action of the proportional band adjusting means and by the addition of the reset section 21 which will always insure that the variable will eventually come back to the desired value.

While a negative temperature coefficient resistor has been shown at 33, it will be obvious that a positive temperature coefficient resistor may be substituted elsewhere in the circuit so as to effect the same proportional band change. In addition, other well known methods of automatic reset may be incorporated in the apparatus instead of the thermal reset shown. It will be further obvious that the present arrangement is adapted to any type of control and should not be restricted to electrical control only.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that in some cases certain features of the present invention may be used to advantage without a corresponding use of other features.

Having now described my invention, what I claim as new and desire to secure by Letters Patent is:

1. Apparatus for controlling the magnitude of a variable, comprising, variable sensing means, an electrical circuit whose balance is adjustable by said sensing means, an output controller arranged to affect the magnitude of the variable, means connecting said circuit to adjust said output controller in accordance with the balance of said circuit, said output controller being connected to adjust the balance of said circuit, means connected to said circuit to vary the ratio of the extent of controller balancing action in said circuit to the balance adjustment of said sensing means, and means indicative of the need for operation of said output controller connected in adjusting relation to said last named means to vary said ratio.

2. In an electrical control apparatus for regulating the magnitude of a variable, the combination comprising, a controller having as an input a signal indicative of the magnitude of the variable, output means controlled by said controller in accordance with the magnitude of said signal, said output means having a balancing action on said controller to remove the effect of said signal, adjusting means connected to said controller to vary the ratio of the extent of balancing to input signal magnitude, and means automatically and steplessly adjusting said last named ratio adjusting means in accordance with a signal indicative of the need for operation of said output means.

3. A proportional controller for controlling the magnitude of a variable comprising, a controller input, a controller output, means connecting said input to said output so that the controlling action of said output will be proportional to said input, proportional band adjusting means in said last named connecting means for adjusting the proportional relation between said input and output, and means automatically adjusting said proportional band adjusting means by an amount proportional to the controlling action of said controller output.

4. A proportional electrical controller for controlling the magnitude of a variable comprising, input signal producing means for said controller, output control means adjusted by said controller, said output control means producing a balancing action in said controller, adjusting means connected to said controller for varying the ratio of the input signal amplitude to the extent of rebalancing by said output control means, electrical means indicative of the output control action of said output control means, and means including said electrical means for varying said ratio adjusting means.

5. A proportional electrical controller for controlling the magnitude of a variable comprising, input signal producing means for said controller, output control means adjusted by said controller, input signal to output control action adjusting means comprising a voltage divider having a temperature sensitive resistor therein, an electrical heater having a heating action indicative of the output control action of said output control means, and means mounting said heater adjacent said resistor to vary the variations in output control action with respect to the magnitude of said input signal.

6. A proportional electrical controller for controlling the magnitude of a variable comprising, input signal producing means for said controller, output control means adjusted by said controller, input signal to output control action adjusting means, electrical means indicative of the output control action of said output control means, means including said electrical means for varying said adjusting means, and automatic reset means connected to said controller.

7. A proportional electrical controller for controlling the magnitude of a variable comprising, input signal producing means for said controller, output control means adjusted by said controller, input signal to output control action adjusting means comprising a voltage divider having a temperature sensitive resistor therein, an electrical heater having a heating action indicative of the output control action of said output control means, means mounting said heater adjacent said resistor to vary the variations in output control action with respect to the magnitude of said input signal, and automatic means for producing a resetting signal in said controller.

8. Apparatus for controlling the magnitude of a variable comprising, variable sensing means, an electrical circuit whose balance is adjustable by said sensing means, an output controller arranged to effect the magnitude of the variable, means connecting said circuit to adjust said output controller in accordance with the balance of said circuit, said output controller being connected to adjust the balance of said circuit in a followup sense, means indicative of the need for operation of said output controller arranged to vary the rebalancing action of said output controller with respect to the action of said sensing means by an amount proportional to the operation of said output controller, and resetting means in said circuit arranged to slowly eliminate the followup action of said output controller.

9. In a controller for maintaining constant the magnitude of a variable, the combination comprising, a balanceable electrical circuit having an input signal produced by a variable sensing means and an output in the form of an electrical signal adapted to change the magnitude of the variable with a circuit rebalancing action effected by said output electrical signal, adjustable circuit means for varying the ratio between said input signal and the rebalancing action required by said output electrical signal to effect circuit balance, said adjustable circuit means normally maintaining the ratio so that a small input signal will require a large rebalancing action from said output signal, and means for adjusting said adjustable means by an amount proportional to the operation of said output, said means when operative changing the ratio of input to output so that a smaller rebalancing action is required of said output signal to balance an input signal.

10. In a controller for maintaining constant the magnitude of a variable, the combination comprising, a balanceable electrical circuit having an input signal produced by a variable sensing means and an output in the form of an electrical signal adapted to change the magnitude of the variable with a circuit rebalancing action effected by said output electrical signal, adjustable circuit means for varying the ratio between said input signal and the rebalancing action required by said output electrical signal to effect circuit balance, said adjustable circuit means normally maintaining the ratio so that a small input signal will require a large rebalancing action from said output signal, means for adjusting said adjustable means by an amount proportional to the operation of said output, said means when operative changing the ratio of input to output so that a smaller rebalancing action is required of said output signal to balance an input signal, and automatic resetting means in said electrical circuit for slowly eliminating the rebalancing action of said output signal.

11. In a self balancing proportioning controller for maintaining the magnitude of a variable at a desired value, the combination comprising, proportional band adjusting means for said controller for adjusting the ratio of controller self balancing to controller input, and means indicative of the operation of the controller for effecting a change in the magnitude of the variable and for varying the action of said proportional band adjusting means.

12. In a proportioning controller for maintaining the magnitude of a variable at a desired value, the combination comprising, proportional band adjusting means for said controller, means indicative of output controlling action by said controller connected to effect a change in the magnitude of the variable for varying the action of said proportional band adjusting means, and automatic reset means connected to said controller to slowly affect the controlling action of said controller to maintain the magnitude of the variable constant.

References Cited in the file of this patent

UNITED STATES PATENTS

| | | |
|---|---|---|
| 2,336,994 | MacKay | Dec. 14, 1943 |
| 2,593,950 | Williams | Apr. 22, 1952 |
| 2,653,308 | Allen | Sept. 22, 1953 |
| 2,668,264 | Williams | Feb. 2, 1954 |